United States Patent [19]

Koizumi et al.

[11] Patent Number: 4,836,461
[45] Date of Patent: Jun. 6, 1989

[54] WIRE WINDING MACHINE FOR STATOR CORES

[75] Inventors: Tetsuro Koizumi, Yokohami; Masato Kamei, Tokyo, both of Japan

[73] Assignee: Kamei Machine Project Co., Ltd., Japan

[21] Appl. No.: 148,060

[22] Filed: Jan. 25, 1988

[30] Foreign Application Priority Data

Jul. 13, 1987 [JP] Japan ............................... 62-172948

[51] Int. Cl.$^4$ .......................................... H01F 41/04
[52] U.S. Cl. ................................. 242/1.1 R; 242/7.15
[58] Field of Search ............. 242/1.1 R, 1.1 A, 1.1 E, 242/7.05 B, 7.05 C, 7.13, 7.14, 7.15, 7.16, 7.17, 7.18; 29/605, 732, 733, 736, 596

[56] References Cited

U.S. PATENT DOCUMENTS

| | | |
|---|---|---|
| 1,407,033 | 2/1922 | Huggins ........................... 242/1.1 R |
| 1,595,396 | 8/1926 | Herrick ............................ 242/1.1 R |
| 2,339,589 | 1/1944 | Stearns ....................... 242/7.05 C X |
| 2,551,135 | 5/1951 | Justice ............................. 242/1.1 R |
| 3,082,966 | 3/1963 | Frederick ........................ 242/1.1 R |

FOREIGN PATENT DOCUMENTS 148811 11/1981 Japan ................................. 242/7.17

Primary Examiner—Joseph J. Hail, III
Attorney, Agent, or Firm—Ostrolenk, Faber, Gerb & Soffen

[57] ABSTRACT

In a wire winding machine, combined three-dimensional movement of a wire dispensing nozzle and a main post on which a stator core is held provides sequential and automatic winding of a wire about the terminal pins of the stator core and formation of field windings thereon. The wire winding machine obtains a remarkable reduction in the required operational steps and substantially reduced production costs.

7 Claims, 3 Drawing Sheets

WIRE WINDING MACHINE FOR STATOR CORES

BACKGROUND OF THE INVENTION

The present invention relates to an improved wire winding machine for stator cores, and more particularly relates to an automatic machine for winding wires on terminal pins and forming field windings, both on a stator core.

Production of a stator core includes two major operations, i.e. winding of wires on terminal pins on the stator core and formation of field windings of the stator core. In the case of the conventional production, such major operations are carried out in different discontinuous processes by different machines entailing much labor and a high expense.

SUMMARY OF THE INVENTION

It is the object of the present invention to carry out the above-described two major operations in production of, e.g. a device which has a plurality of members which extend in different directions a stator core, in operational sequence to reduce the operational steps and production cost.

In accordance with the present invention, a wire nozzle mounted to a frame unit, which is rotatable about a vertical shaft, is registerable to horizontal and vertical positions, a main post holding a stator core is vertically displaceable and axially rotatable, and three-dimensional combined movements of the wire nozzle and the main post form field windings in succession to wire winding about terminal pins on the stator core.

DESCRIPTION OF THE PREFERRED EMBODIMENTS

Figure 1:
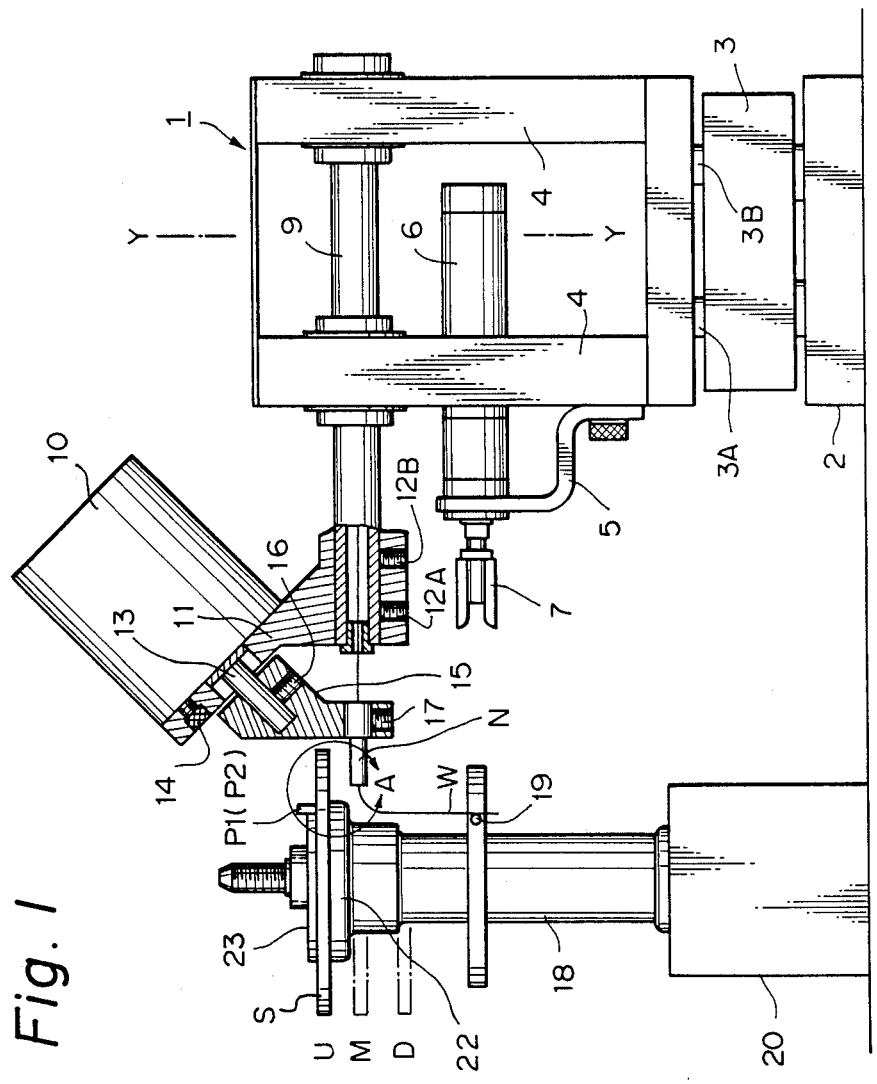
FIG. 1 is a side view, partly in section, of one embodiment of the wire winding machine in accordance with the present invention.

One embodiment of the wire winding machine in accordance with the present invention is shown in FIG. 1, in which a frame unit 1 includes a rotary unit 3 supported on a pedestal 2 by means of a pair of crank shafts 3A and 3B. Above the rotary unit 3, is a frame 4 also supported by the crank shafts 3A and 3B.

Figure 4:
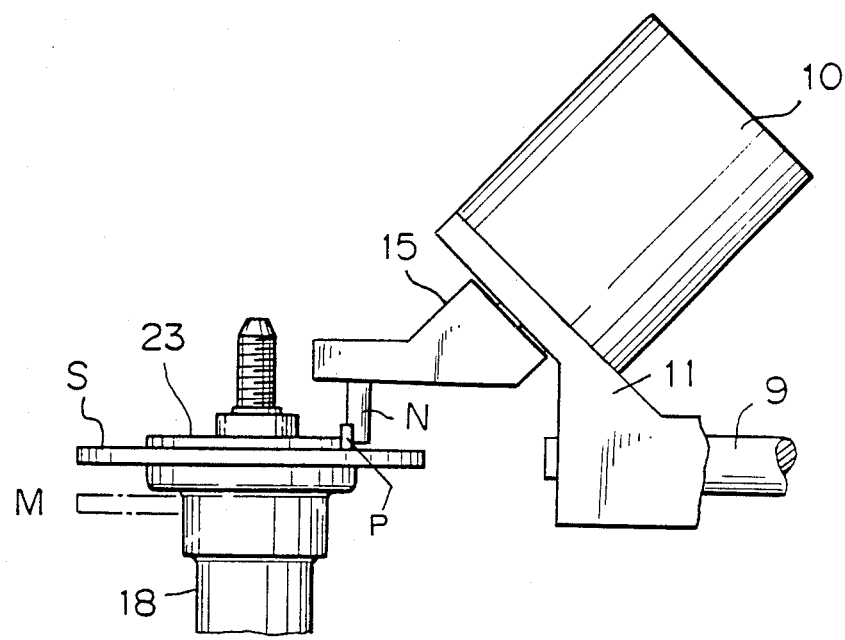
FIG. 4 is an enlarged side view of a section A in FIG. 1.

A fluid cylinder 6 is horizontally supported by the frame 4 and its piston carries a clamper 7 for holding a wire W to be wound on a pin. The cylinder 6 is connected to a given compressed fluid source and drives the clamper 7 for horizontal reciprocation for operating the wire as later described in more detail. Above the cylinder 6, is a support tube 9 horizontally mounted to the frame 4. An upwardly extending bent arm 11 is secured to the distal end of the support tube 9 by means of set screws 12A and 12B. The distal end of this bent arm 11 securely carries a rotary cylinder 10 via set screw 14 in an inclined arrangement. An output shaft 13 of this rotary cylinder 10 extends idly through the bent arm 11 and a winding unit 15 is secured to the output shaft 13 by means of a set screw. The winding unit 15 extends downwards in the position shown in FIG. 1 and a nozzle N is horizontally secured to the lower end of the winding unit 15 by means of a set screw 17 in axial alignment with the support tube 9. The winding unit 15 has a bent construction so that, as the output shaft 13 rotates, the nozzle N should be registered at a vertical position as shown with dashed lines in FIG. 4.

Figure 3:
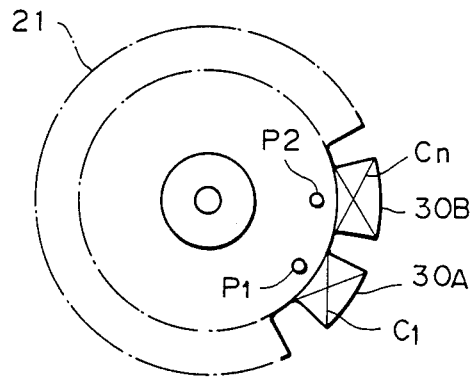
FIG. 3 is a simplified plan view of a stator core.

In spaced relation to the pedestal 2, a drive unit 20 arranged on the floor on which the pedestal 2 is located carries a main post 18 for vertical displacement and horizontal rotation. To the top of the main post 18 a stator S is detachably mounted by being clamped between upper and lower holder plates 22 and 23. As shown in FIGS. 1 and 3, a pair of terminal pins P1 and P2 are secured to the top face of the stator core S. A pin 19 is mounted to the main post 18 at a level such that the wire W should be clamped between the pin 19 and the clamper 7 when the latter advances by being driven by the cylinder 6.

The wire W to be wound is conducted through the support tube 9 to the nozzle N and hangs down therefrom near the pin 19 on the main post 18.

The wire winding machine operates as follows. By way of preparation, the cylinder 6 is activated to advance the clamper 7 towards the main post 18 to clamp the wire W hanging from the nozzle N between the clamper 7 and the pin 19 on the main post 18. The stator core S is detachably secured to the main post 18 by means of the holder plate 22 and 23 at an upper position U.

Figure 2:
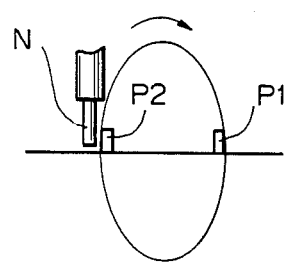
FIG. 2 shows the path of travel of a wire nozzle around terminal pins.

Next, the drive unit 20 is activated to lower the stator core S to a middle position M shown in dashed lines. Then, the rotary cylinder 10 is activated to rotate its output shaft 13 over 180° so that the nozzle N on the winding unit 15 will come near one of the terminals P1, as shown in FIG. 2. The nozzle N will have then assumed a vertical position. Next, the crank shafts 3A and 3B are rotated in a manner whereby, by crank shaft action, the winding unit 1 as a whole revolves about a common vertical axis Y—Y. By this revolving of the winding unit 1, the nozzle N will also be revolved around the terminal pin P1 to cause the wire W held by the nozzle N to be wound therearound.

After completing forming a prescribed number of windings, the cylinder 6 is again activated to cause the clamper 7 to recede from the pin 19 to release the wire W. The rotary cylinder 10 is then activated so that the winding unit 15 should resume the initial position in which the nozzle N assumes a horizontal position.

Next, by vertical and rotary reciprocations of the main post 18 driven by the drive unit 20, a field winding C1 is formed on a field core 30A. After formation of every field winding, the main post 18 is rotated in one direction over a prescribed angle and, finally, a field winding Cn is formed on a field core 30B as shown in FIG. 3. Next, as in the case of the terminal pin P1, the wire W is wound about the other terminal pin P2 and the wire N is cut by a suitable known manner. Then, the main post 18 moves downwards to register the stator core S to a down position D at which the stator core S is suited for being replaced.

In accordance with the present invention, wire winding on terminal pins and formation of field windings on field cores on a stator core can be carried out sequentially, in an automatic manner, thereby reducing greatly the number of fabrication steps.

I claim:

1. A wire winding machine for winding a wire on a device having a plurality of members which extend in different directions, said wire winding machine comprising:
- a vertically extending frame unit and a vertically extending first axis associated with said frame unit;
- revolving means coupled to the frame unit and effective for causing the frame unit to revolve about said first axis;
- a support tube secured to said frame unit and extending generally perpendicularly to said first axis; and
- a winding unit mounted to said support tube;
- means for rotating the winding unit about a second axis which second axis is inclined relative to said first axis;
- said winding unit having and supporting a wire dispensing nozzle which assumes a horizontal or vertical orientation in response to rotation of said rotating means of said winding unit about said second axis, whereby said winding machine is effective for holding a wire in position for being wound on said plurality of members, regardless of whether said members extend horizontally or vertically; and
- secondary rotating means for allowing relative movement between the wire dispensing nozzle and a horizontally extending member.

2. The wire winding machine of claim 1, wherein said secondary rotating means comprises an uprightly extending main post for holding the device thereon, said main post including means for moving the post vertically up and down and for rotating the post about a third axis.

3. The wire winding machine of claim 2, wherein the device is a stator core and the stator core includes a first member which extends vertically and a second member which extends horizontally, the first and second members requiring a wire to be wound thereon, the main post including means for controlling the main post such that it is moved up and down and is rotatably reciprocated to cause the second member to revolve around said wire dispensing nozzle of said winding unit.

4. The wire winding machine of claim 3, wherein said main post includes means for holding said stator core at a plurality of vertical positions.

5. The wire winding machine of claim 2, wherein said revolving means comprises a crank shaft mechanism.

6. The wire winding machine of claim 2, further comprising clamping means secured to said frame unit and including a clamper which is movable toward and away from said main post in a manner effective for clamping an end of a wire at said main post.

7. The wire winding machine of claim 6, wherein said clamping means comprises a fluid cylinder horizontally mounted to said frame unit, said clamper secured to a piston rod of said fluid cylinder, and a pin mounted to said main post in position to be engaged by said clamper.

* * * * *